United States Patent [19]

Stieff

[11] Patent Number: 5,528,836
[45] Date of Patent: Jun. 25, 1996

[54] ALIGNER SENSOR LOCK

[75] Inventor: Michael Stieff, Wentzville, Mo.

[73] Assignee: Hunter Engineering Company, Bridgeton, Mo.

[21] Appl. No.: 353,179

[22] Filed: Dec. 9, 1994

[51] Int. Cl.⁶ ................................................. G01B 5/255
[52] U.S. Cl. ............................................ 33/203.18; 33/288
[58] Field of Search ............................... 33/203, 203.18, 33/203.12, 203.13, 203.16, 203.19, 288

[56] References Cited

U.S. PATENT DOCUMENTS

| | | |
|---|---|---|
| Re. 33,144 | 1/1990 | Hunter et al. . |
| 3,709,451 | 1/1973 | Graham .................. 33/203.18 |
| 3,758,958 | 9/1973 | Jordan ..................... 33/336 |
| 3,892,042 | 7/1975 | Senften . |
| 3,927,287 | 12/1975 | Hopwood . |
| 4,090,050 | 5/1978 | Siiberg . |
| 4,091,250 | 5/1978 | Siiberg . |
| 4,115,007 | 9/1978 | Thiele et al. . |
| 4,152,839 | 5/1979 | McDonald ................ 33/366 |
| 4,457,075 | 7/1984 | Murata .................... 33/203.15 |
| 4,466,196 | 8/1984 | Woodruff .................. 33/288 |
| 4,541,162 | 9/1985 | Halvin .................... 33/203.18 |
| 4,546,548 | 10/1985 | Bullock Sr. ............... 33/203 |
| 4,574,490 | 3/1986 | Curchod .................. 33/203.18 |
| 4,718,759 | 1/1988 | Butler . |
| 4,785,242 | 11/1988 | Vaidya et al. . |
| 4,953,296 | 9/1990 | Spainhour ................ 33/203.18 |
| 4,967,480 | 11/1990 | DeLuca ................... 33/288 |
| 5,056,233 | 10/1991 | Hechel et al. ............. 33/288 |
| 5,311,668 | 3/1994 | Longa et al. .............. 33/203.12 |

Primary Examiner—Christopher W. Fulton
Attorney, Agent, or Firm—Polster, Lieder, Woodruff & Lucchesi

[57] ABSTRACT

A locking mechanism is provided for a vehicle wheel aligner sensor having a housing with a rotatable shaft extending from the housing. The shaft is removably received in a sensor support mounted to a vehicle wheel. The locking mechanism includes a gear fixed to the shaft within the sensor housing and a worm gear mounted on a lever. The lever is pivotally mounted in the housing and at least a part of the lever extends above the housing so that the lever may be pivoted by an operator. The lever is pivotable to move the worm between a locked position in which the worm engages the gear and an unlocked position in which the worm is out of engagement with the gear. The lever is axially rotatably mounted in the sensor housing so that the worm may be rotated with respect to the gear when the lever is in the locked position to allow for fine adjustment of the sensor's rotational position.

34 Claims, 7 Drawing Sheets

ALIGNER SENSOR LOCK

BACKGROUND OF THE INVENTION

This invention relates to aligner sensors used for aligning vehicle wheels, and, in particular, to a sensor lock to maintain the sensor in a level position.

To perform a vehicle wheel alignment, an operator initially mounts sensors to a vehicle's wheels. Typically an adapter or sensor support is mounted to the wheel rim to rotate with the wheel. A shaft extends from the sensor and is received in the adapter to pivotally mount the sensor to the adapter. One of the initial operations the operator performs is to level the sensor. If the sensors are not level, the data produced by the aligner will be incorrect. A level indicator is generally mounted on the sensor housing and the sensor is pivoted until the indicator reads level. A lock is provided to hold the sensor in its level position.

In the past, a rotatable knob has been used which operates a clamp, or caliper brake-type lock, which in turn grasps the support shaft to lock the sensor against pivotal motion with respect to the wheel. However, when the knob is turned, the sensor may be moved slightly out of level, requiring that the clamp be released and the sensor releveled. The knob is typically located on the front of the sensor housing. If the sensor housing accidentally falls, the sensor may fall on the knob, damaging the locking device.

Further, the degree to which the sensor is locked against pivotal motion depends on the tightness to which the knob is turned. If the knob is not tightened sufficiently, the knob may loosen, and the sensor may begin to pivot and come out of level during an alignment procedure. If the operator is unaware of the out of level condition, the alignment data readings produced by the sensors may be incorrect.

SUMMARY OF THE INVENTION

One object of the present invention is to provide a lock which will lock an aligner sensor against pivotal motion with respect to a support on which the sensor is hung.

A second object is to provide such a lock which can easily be operated to lock the sensor in a level position.

A third object is to provide such a lock which allows for fine tuning or adjusting of the sensor's rotational position relative to the wheel assembly.

A fourth object is to provide such a lock which uses a lever, rather than a knob, to operate the lock.

These and other objects will become apparent to those skilled in the art in light of the following description and accompanying drawings.

Briefly stated, a locking mechanism is provided for a vehicle wheel aligner sensor. The aligner sensors are secured to vehicle wheel assemblies by adapters which are removably mountable to wheels of the vehicle to rotate with the wheels. The sensor adapters each have a generally horizontal bore. Each sensor has a shaft rotatably journaled in the sensor which extends generally horizontally from the sensor to be received in, and pivotally fixed to, the adapter to pivotably hang the sensor on the adapter. The locking mechanism includes a gear fixed to the shaft within the sensor housing and a locking bar or lever pivotally mounted in the sensor.

The lever defines a worm having spiral which is selectively engagable with the gear. The lever can be pivoted between a first, locked, position in which the worm spiral engages the gear to prevent pivotal motion of the sensor about the support shaft, and a second, unlocked, position in which the worm spiral is out of engagement with the gear so that the sensor may freely be pivoted about the support shaft. The lever preferably is pivoted about a point above the worm, but may be pivoted about a point below the worm. The worm may be integrally formed on the lever, but is preferably a separate piece fixed to the lever.

The lever and worm are preferably axially rotatably mounted in the housing, so that they may be rotated when the lever is in the locked position. Thus, when the lever is rotated in the locked position, the worm and gear will interact to pivot the housing about the shaft. This allows for "fine tuning" or fine adjustment of the sensor position.

The locking mechanism is provided with an over-center spring to maintain the lever in its desired position. When the lever is pushed beyond a certain point, the spring tends to bias the lever in that direction, and will maintain it in that position. The spring thus maintains the lever in its current position, whether that position be the locked or unlocked position.

The interaction of the worm and gear also provides for automatic unlocking means if the wheel or sensor is pivoted with respect to the other beyond a desired point. The gear teeth and the worm spiral each define a sloped surface. When the wheel or sensor is pivoted, the worm and gear are forced to move with respect to each other. Continued rotation of the wheel or sensor will thus cause the gear to force the worm out of engagement with the gear. The over-center spring will then act to urge the lever to, and maintain it in, the unlocked position.

DESCRIPTION OF THE PREFERRED EMBODIMENT

Figure 1:
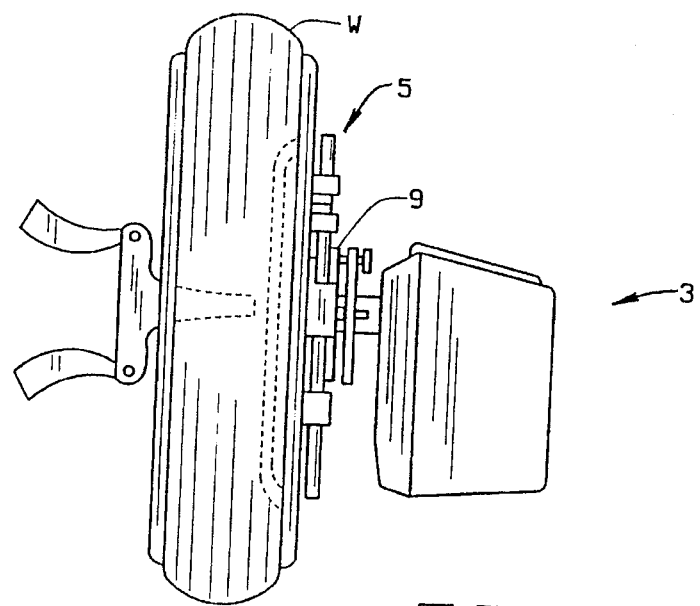
FIG. 1 is a side elevational view of a sensor of the present invention mounted to a wheel assembly.

A vehicle wheel assembly W is shown in FIG. 1 with an aligner sensor 3 mounted thereto. A wheel adapter 5 is removably mounted to the wheel assembly and the sensor 3 is removably mounted to the adapter. The sensor 3 is preferably a sensor such as is described in U.S. Pat. No. B1 Re. 33,144, which is assigned to the same assignee as the present invention, and which is incorporated herein by reference.

The adapter 5 has a pair of parallel, spaced apart rods 7 to which at least one movable set of arms 8 is attached. The ends of arms 8 may be moved inwardly or outwardly to bear against an inner circumferential surface of the wheel assembly W to secure adapter 5 to the wheel assembly adapter 5 thus will rotate with the wheel assembly. A support 9, having an opening (not shown), is journaled on the rods 7 to be moved along the rods.

Figure 3:
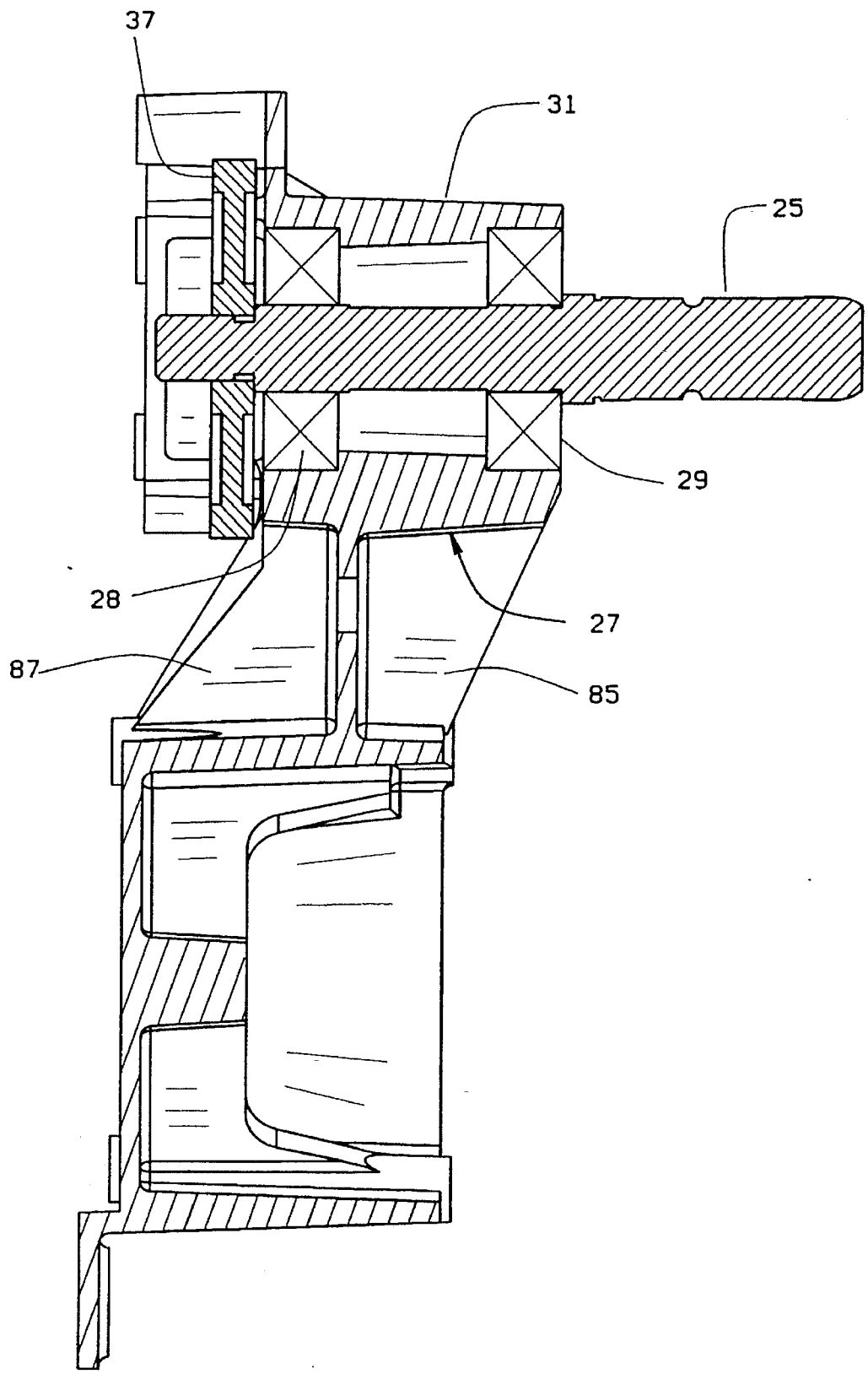
FIG. 3 is a cross-sectional view of taken along line 3—3 of FIG. 2, showing the mounting for the sensor lock, the sensor lock being omitted for purposes of clarity.
Figure 4:
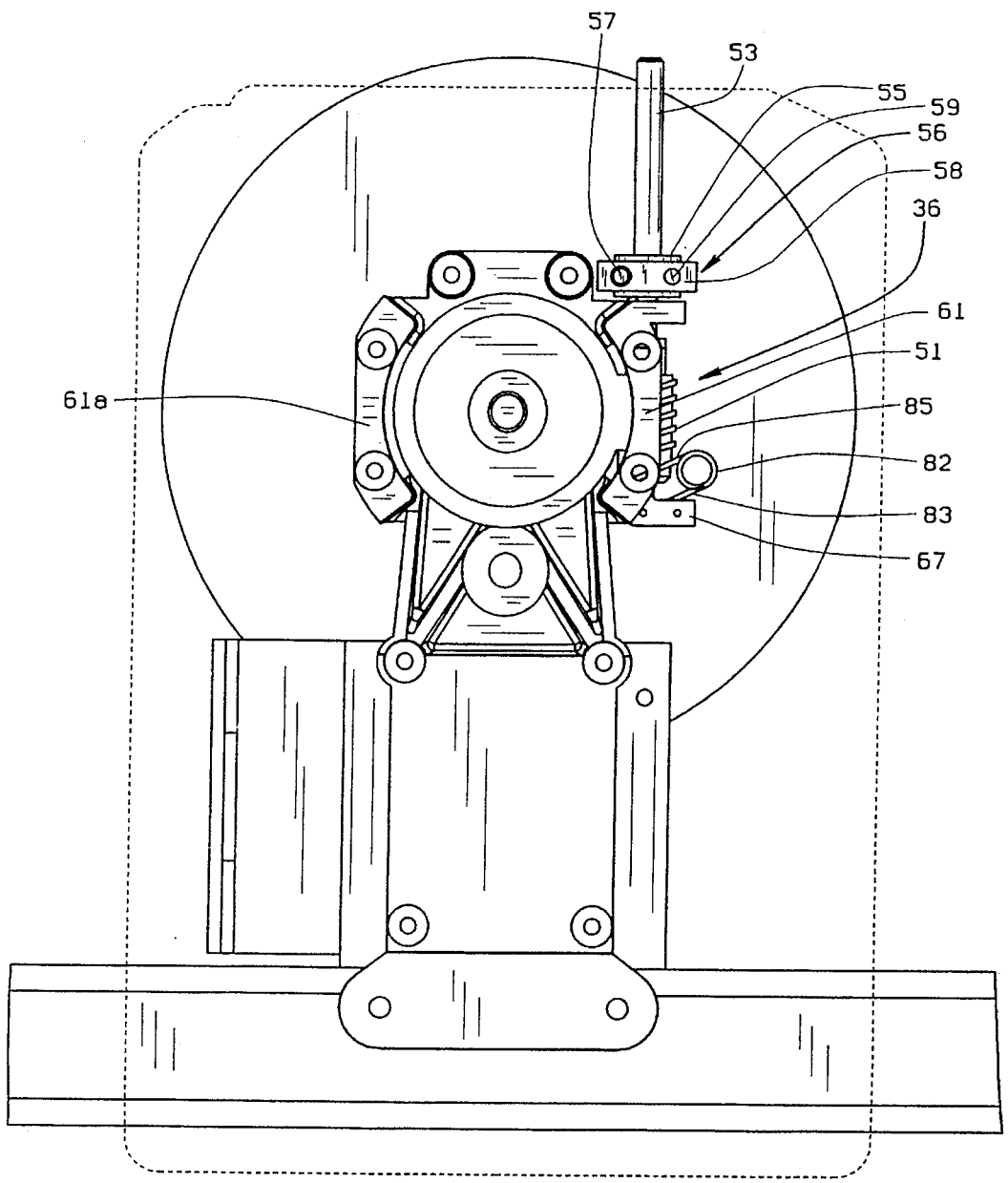
FIG. 4 is a front plan view of one illustrative embodiment of a sensor lock of the present invention, the housing of the sensor being shown in phantom to show the location of the sensor lock within the housing.

Sensor 3 has a housing 20, including a front housing 21 and a back housing 22, which encases the sensor mechanism. A bubble level 23 is mounted on the sensor housing so that an operator can determine when the sensor is level. Although the level is shown to be a bubble level, other types of levels, including electronic level sensors can be used. A shaft 25 (FIG. 3) is journaled in a bearing assembly 27 having a two spaced apart bearings 28 and 29 secured in a bearing housing 31. Shaft 25 rotatably extends through bearing assembly 27 and out the housing back 22 to be received in the hole of adapter support 9. Shaft 25 can thus be rotated with respect to the sensor 3 and the sensor housing. A lock on the adapter 5 is operable to grab or clamp the shaft 25 to prevent the shaft from rotating with respect to the adapter 5. The adapter lock does not form a part of this invention, and any conventional lock may be used to secure the shaft 25 in adapter 5 to hold shaft 25 in adapter 5 and to prevent rotation of shaft 25 with respect to adapter 5. With the shaft locked in the adapter, the sensor 3 is mounted to the wheel to pivot with respect to the wheel in a plane generally parallel to the vertical plane of the wheel.

A locking mechanism 36 (FIGS. 4–7) is provided in the sensor housing to lock the sensor in a desired, generally level, position. Locking mechanism 36 includes a gear 37 which is rotatably fixed to shaft 25 by any conventional means. Gear 37 thus cannot be moved or pivoted relative to shaft 25. For example, gear can be fixed to the shaft by a lock washer positioned between bearing 28 and a lock nut threaded on to the end of shaft 25. Alternatively, the gear could be threaded onto the shaft. Any other means could, of course, be used to rotatably fix gear 37 to shaft 25. Because gear 37 is fixed to shaft 25, it is also fixed rotationally with respect to the wheel assembly W. Thus, sensor 3 can be pivoted about gear 37 to pivot with respect to adapter 5 and wheel assembly W. As is described below, locking mechanism 36 engages gear 37 to rotationally lock the housing, and hence the sensor, in position.

Locking mechanism 36 includes a worm 51 (FIGS. 4–7) which is pivotably mounted in housing 21 to be moved into and out of engagement with gear 37, between locked and unlocked positions, respectively. As is described below, worm 51 is also rotatably mounted in housing 20. Worm 51 is fixed to an elongate axial shaft or lever 53 which extends both above and below worm 51. Shaft 53 includes an annular groove 54 (FIG. 7). Groove 54 may be formed in shaft 53, but is preferably formed by a bobbin 55 fixed to shaft 53. Bobbin 55 is fixed to shaft 53 to prevent axial movement of the bobbin along the shaft. The shaft, however, may be rotatably journaled in the bobbin. A pin 57 is mounted in housing 21 to pass tangentially through groove 54. The pin 57 is positioned along an inner surface of groove 54, i.e. between bobbin 55 and gear 37 to define a pivot point above worm 51 about which lever 53 can be pivoted.

Shaft 53 is mounted in housing 31 by a retainer 56 which co-operates with shaft groove 54. Retainer 56 includes a plate 58 and a pin 59. Pin 59 is secured in plate 58 which in turn passes over pin 57. Pin 59 is positioned to be on an opposite side of groove 54 from pin 57 and passes through an opposite side of groove 54 from pin 57. Groove 54 is thus sized and shaped to allow lever 53 to be pivoted between its locked and unlocked positions. Retainer 56 prevents groove 54 from slipping off pin 57 and facilitates in preventing axial movement of the lever 53 relative to the housing 20.

Figure 2:
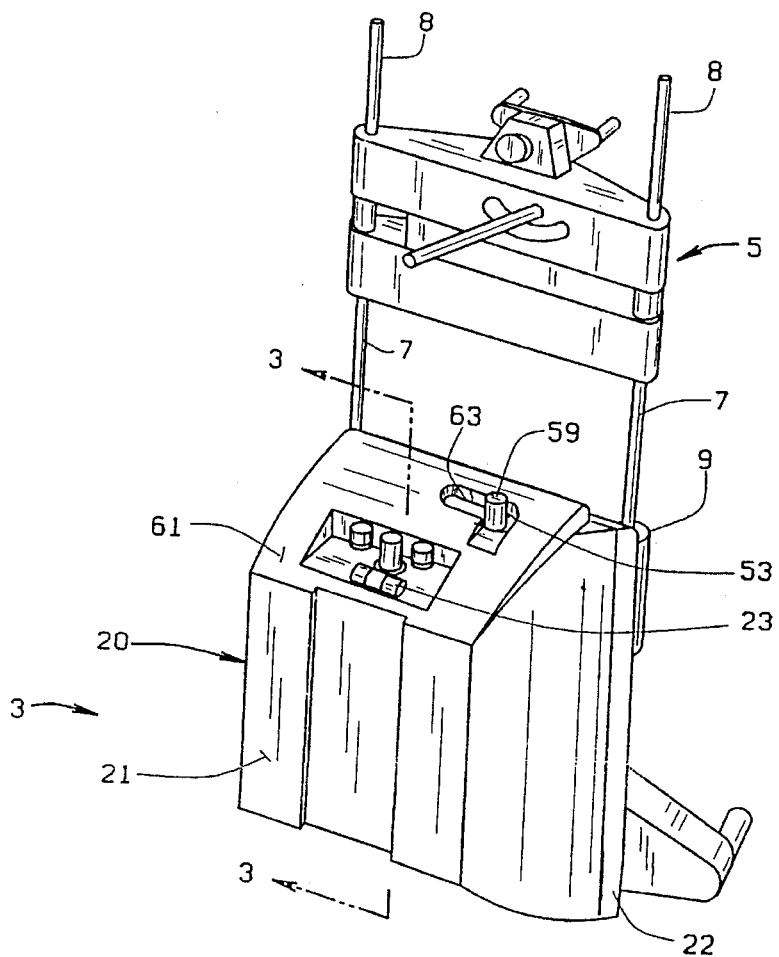
FIG. 2 is a perspective view of the sensor mounted on an adapter.

Shaft 53 extends up through the top 61 of housing 21 (FIGS. 2 and 4) and has a knurled knob 59 at its top. The top 61 of housing 21 has a slot 63 (FIG. 2) in which the shaft may be pivoted by an operator to move worm 51 into or out of engagement with the gear 37. Slot 63 defines a path of travel for the lever and is sufficiently long to allow the lever to be moved between its locked and unlocked positions. As can be appreciated, when worm 51 engages gear 37, the interaction of the worm 51 and gear 37 will prevent pivoting of the sensor, to rotatably lock the sensor in place. Shaft 53 pivots about pin 57 intermediate the ends of shaft 53 and above worm 51. Thus, with reference to FIG. 7, to move the worm from the unlocked to the locked position, shaft 53 is pivoted from left to right. And to move the worm from the locked to the unlocked position, shaft 53 is pivoted from right to left.

Gear 37 is partially surrounded by two generally vertically extending carriages 61 and 61a, having surfaces 62 (FIG. 7) with a curvature similar to gear 37, and a front wall 63. The surface 62 of carriage 61 extends downwardly from plate 58 to a bottom wall 67 which extends to from mounting plate 35. Carriage 61 and plate 35 thus define an elongate opening 69 sized to axially receive bobbin 55 and at least a part of worm 51. As seen, approximately half of worm 51 (i.e. 180° of the worm spiral) is within opening 69. The bottom of shaft 53 is rotatably journaled in a thrust bearing 71 (FIG. 7). Carriage 61 is sized so that the bottom of thrust bearing 71 is spaced slightly above carriage bottom wall 67.

An over-center spring 81 has two coils 82 which are connected by a lead 85 which extends around thrust bearing 71. Lead 85 passes through a slot (not shown) formed in thrust bearing 71 generally transverse to the axis of the bearing. The slot is formed along an inner surface of the bearing so that the lead 85 will be on an opposite side of the bearing from coils 82. Second leads 83 extend from each coil 82 and are received in holes formed in the sides of carriage bottom 67. Over-center spring 81 is provided to maintain lever 53 and worm 51 in a desired position relative to gear 37 (i.e. in or out of engagement with gear 37). When the lever 53, and hence worm 51, are moved in a desired direction, spring 81 will bias the shaft in that direction. For example, when the shaft is moved from the unlocked to the locked position (from left to right in FIGS. 4 and 7), when the shaft passes a certain point, the spring will urge the shaft, and hence worm 51, toward the locked position, and bias the worm into engagement with the gear, to maintain the worm in engagement with the gear. Similarly, when the shaft is moved from the locked to the unlocked position (from right to left in FIGS. 4 and 7), when the shaft passes over a certain point, the spring will operate to move the shaft, and hence the worm, to the unlocked position, to normally bias the worm in the unlocked position.

Figure 5:
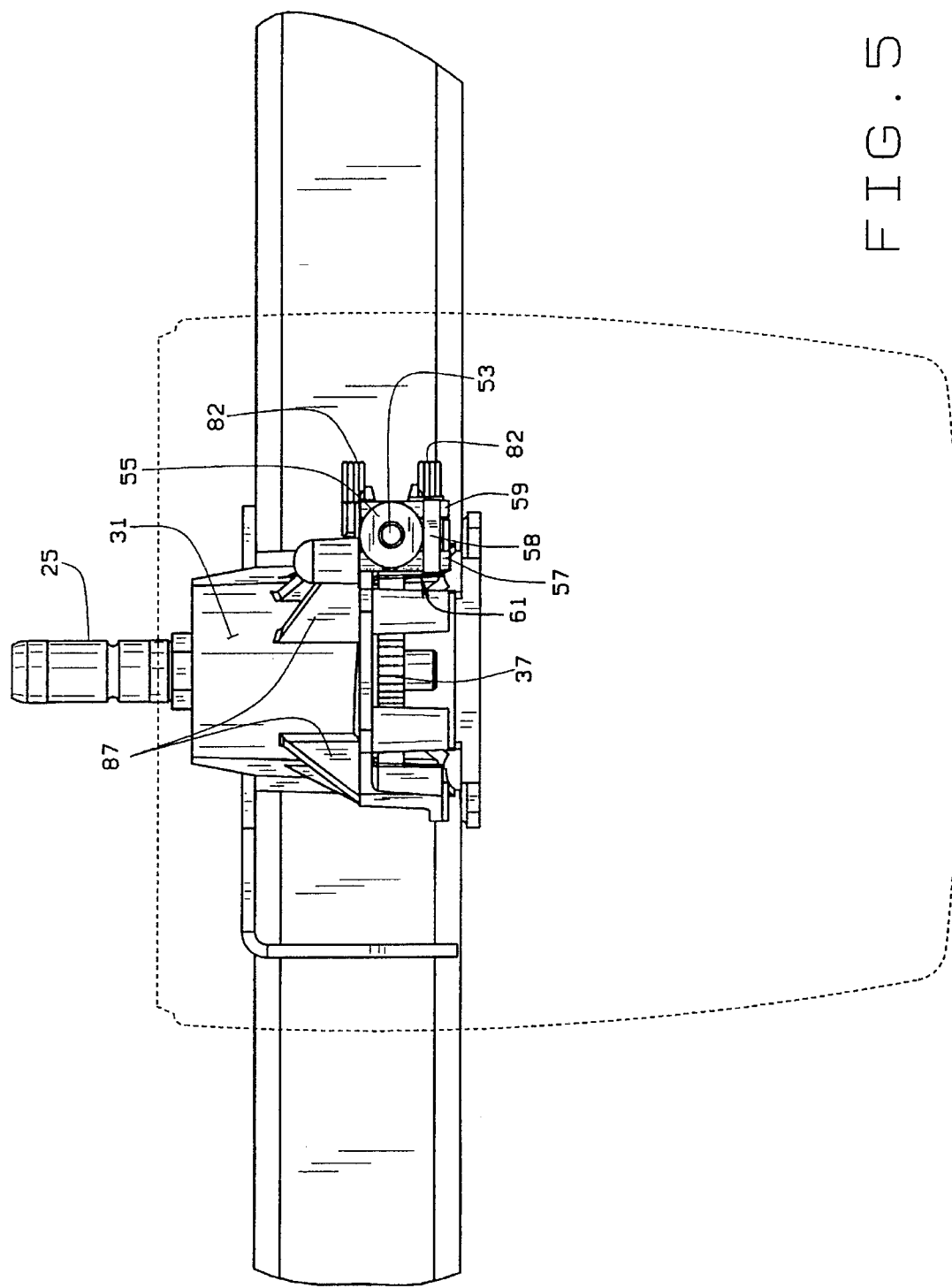
FIG. 5 is a top plan view of the sensor lock, the sensor housing being shown in phantom.
Figure 6:
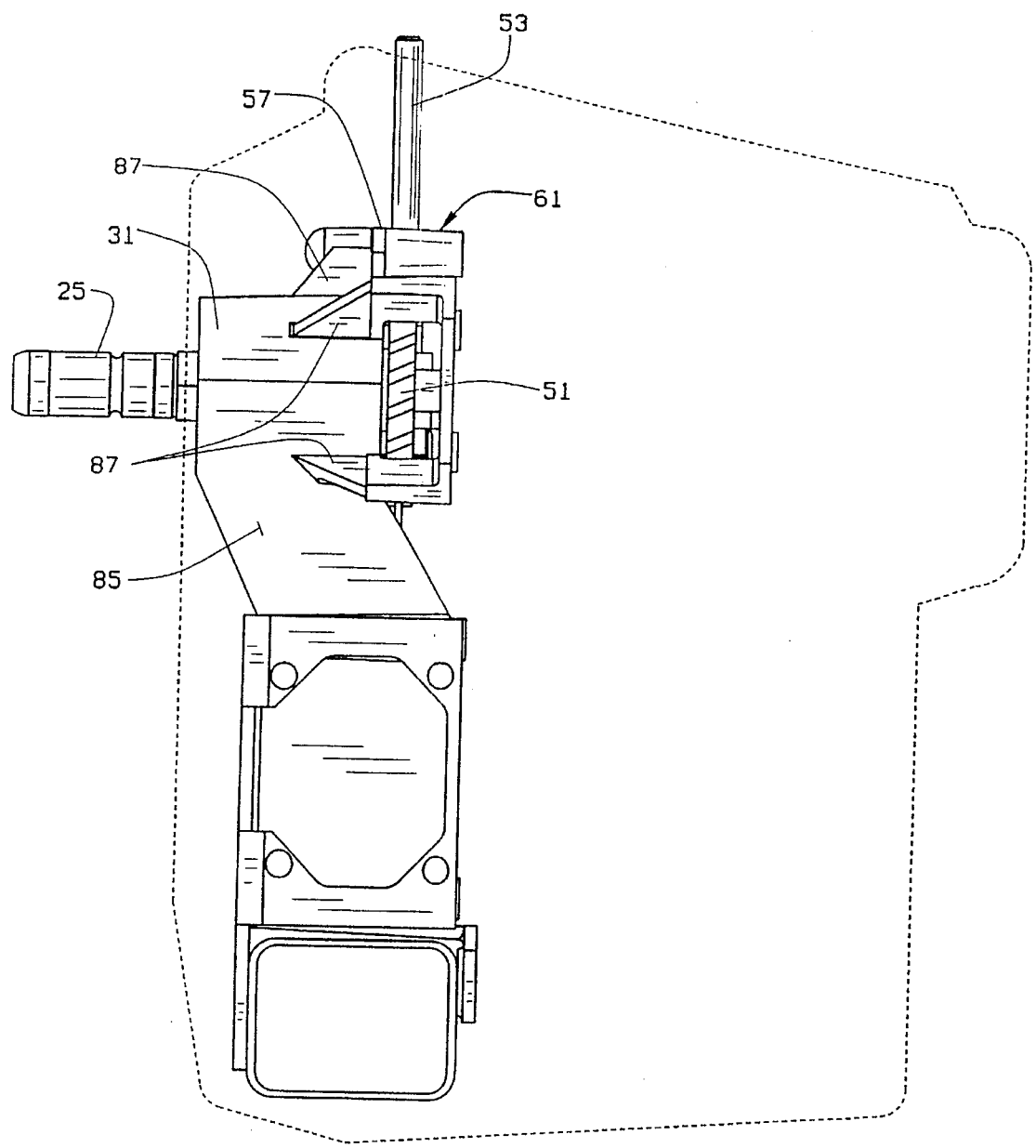
FIG. 6 is a side elevational view of the sensor lock, the sensor housing being shown in phantom.
Figure 7:
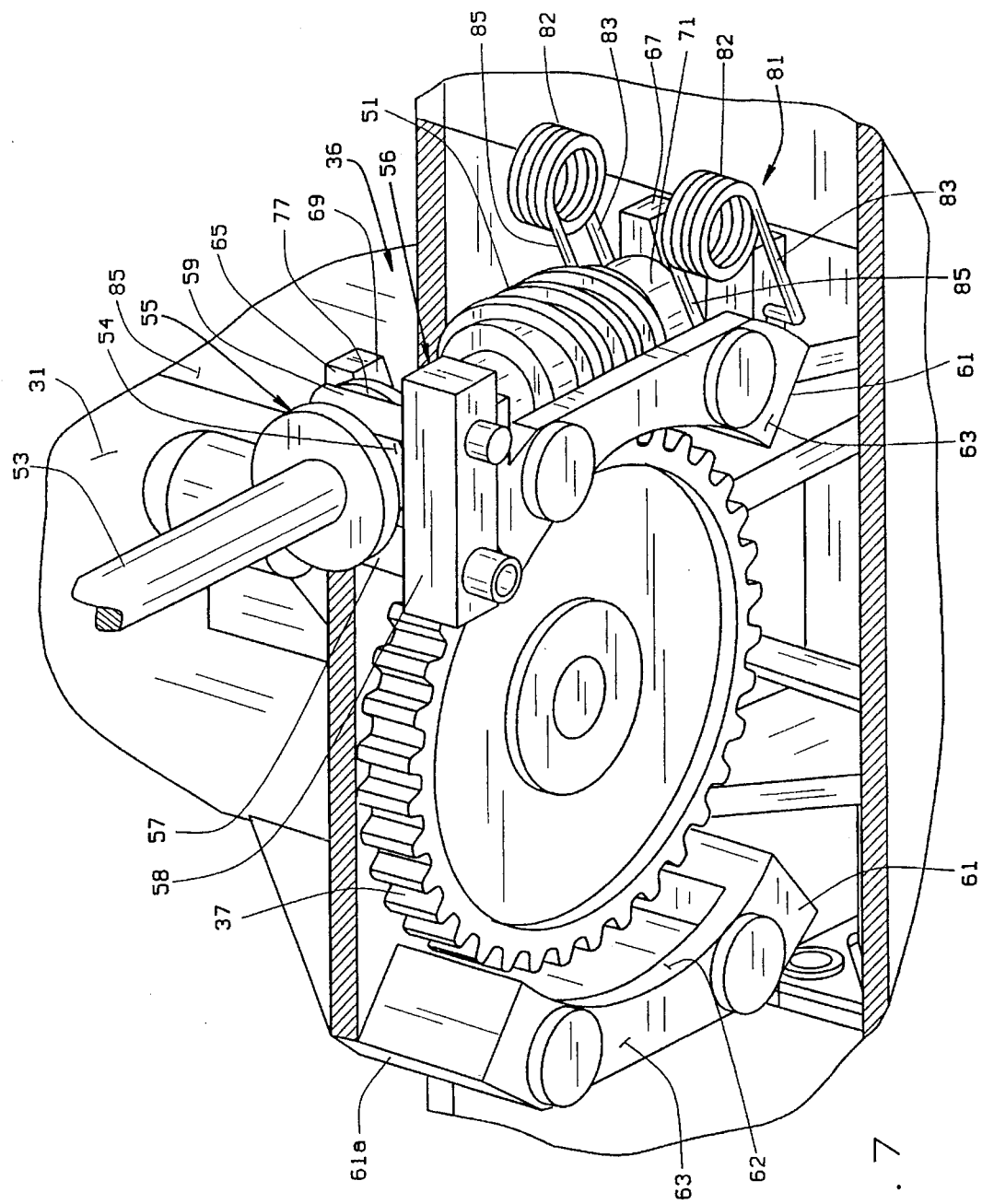
FIG. 7 is a perspective view, partially cut away, of the sensor lock.

Turning to FIGS. 5 and 6, it can be seen that the carriage 61 and pin 57 are mounted to bearing housing 31 and a wall 85 extending from bearing housing 31 by legs 87.

As can be appreciated, locking mechanism 36 provides an easy to operate mechanism which requires no turning of knobs to lock the sensor in position. Lever or shaft 53 is simply pivoted, to move worm 51 into or out of engagement with gear 37. No knobs need be turned to lock the sensor in place. Further, because lock 36 is spring operated, the same locking force will nearly always be applied between the gears, thus different operators will not apply different locking forces to the sensor lock, as would occur with the prior art caliper or clamp type locks.

As noted above, shaft 53 is rotationally mounted in thrust bearing 71, and worm 51 is fixed to shaft 53. Thus, once the worm is placed in engagement with gear 37, the shaft 53, and hence the worm 51, can be rotated to adjust, or fine tune, the rotational position of the sensor. Because gear 37 is rotationally fixed, as worm 51 is rotated, the interaction of worm 51 with gear 37 will cause the sensor housing 20, and hence sensor 3, to pivot about gear 37. The sensor will thus be pivoted with respect to wheel assembly W to adjust the rotational position of the sensor ensure that the sensor is level. This will allow the sensor to be brought into level once the worm 51 has been moved to its locked position.

The interaction of the worm 51 and the gear 37 also acts to unlock the locking mechanism in response to undue rotation of the sensor about the gear. As can be appreciated, the teeth of gear 37 and the spiral of worm 51 each define a sloped surface. When, for example, the wheel or the sensor, is rotated beyond the desired angle, continued rotation causes the gear's teeth to urge the worm spiral out of engagement with the gear. Stated differently, the passage of the gear teeth over the worm spiral (or vice versa) will cause the lever to pivot about its pivot point. Once the lever pivots beyond the spring's over-center point, the spring will act to move the lever and the worm from the locked to the unlocked position.

Figure 8:
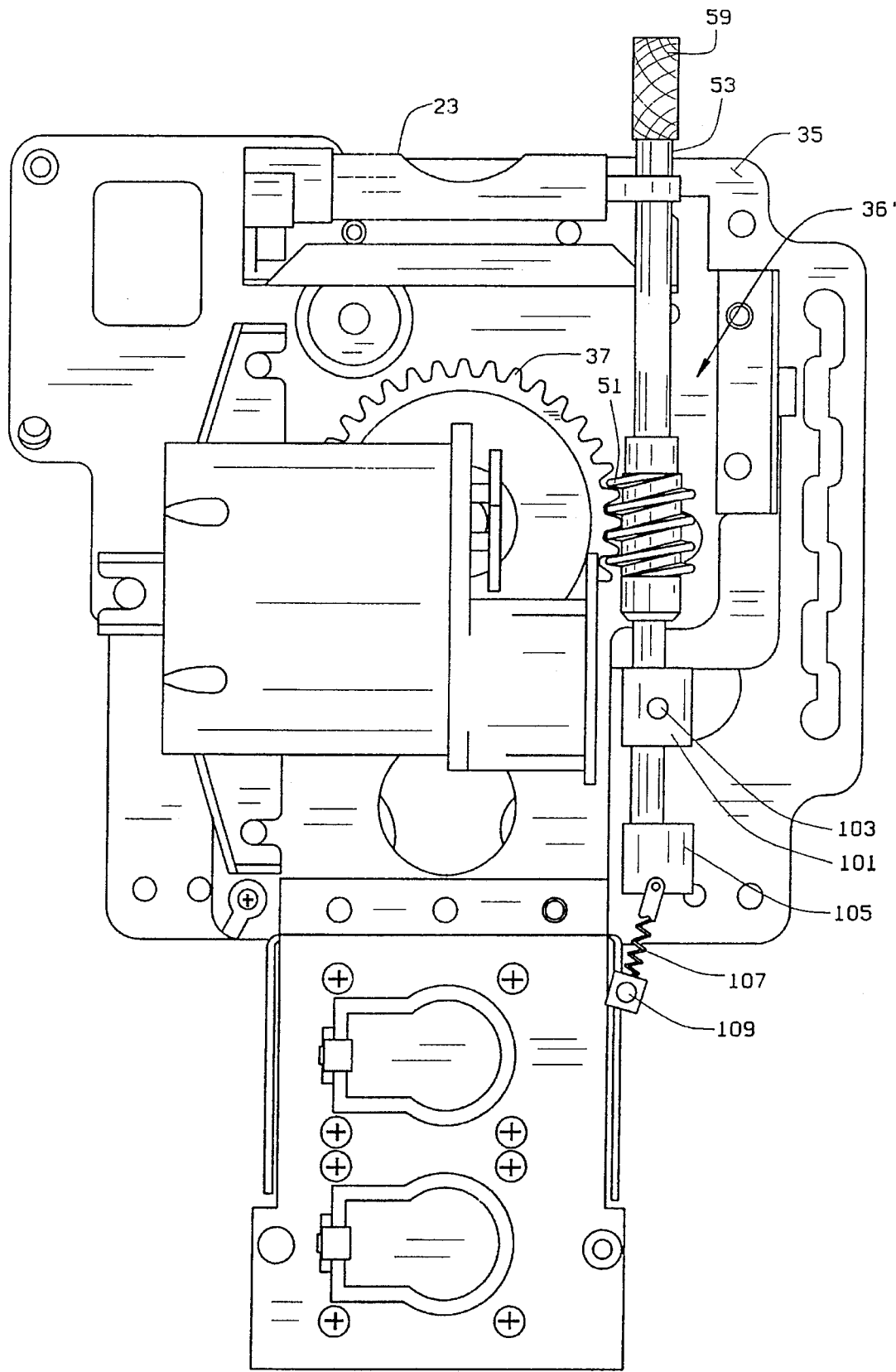
FIG. 8 is a front elevational view of a second embodiment of the sensor lock.

An alternate locking mechanism 36' is shown in FIG. 8. Locking mechanism 36' uses worm 51 and gear 37 to lock the sensor in place. In locking mechanism 36', worm 51 is fixed to shaft 53. Shaft 53, however, is rotationally journaled through a journal box 101 which is mounted to a wall 35 intermediate the bottom of worm 51 and the bottom of shaft 53. Wall 35 is a mounting wall positioned between bearing 28 and gear 37. A pin 103 extends through journal box 101 to pivotally mount the journal box to wall 35. Journal box 101 defines a pivot point for the shaft which is below the worm 51. Preferably, the pivot point is near the bottom of shaft 53. Shaft 53 is rotatably mounted in a base 105. Base 105, in turn, is connected by way of a spring 107 to a lower portion of mounting wall 35. Preferably, a box 109 is pivotally mounted to wall 35, and spring 107 is secured to the box.

As can be appreciated, locking mechanism 36' operates in much the same manner as locking mechanism 36. However, because the lever's pivot point is below the worm, the direction to move the worm from the unlocked to the locked position, and back again, is reversed with respect to locking mechanism 36. Thus, when the shaft 53 is pivoted from left to right, as shown in FIG. 8, worm 53 is brought out of engagement with gear 37 and placed in its unlocked position. Similarly, when shaft 53 is pivoted from right to left, as shown in FIG. 8, worm 51 is brought into engagement with gear 37 and placed in its locked position. Like spring 81, spring 107 is an over-center spring which operates to bias shaft 53 in the direction it is being moved, once it passes over a center point. Spring 107 will thus maintain locking mechanism 36 in either its locked or unlocked position.

Variations, within the scope of the appended claims will be apparent to those skilled in the art. For example, worm 51 can be formed directly on lever 53, to make the worm integral with the lever. A solenoid or other remotely actuable device can be provided which can be used to operate the locking mechanism. The solenoid would be operatively connected to the shaft to pivot the shaft between its locked and unlocked positions. With a solenoid, the operator would simply depress a button which would activate the solenoid to operate the locking mechanism. This locking mechanism could be on housing 20, or could be part of a remote control to operate the locking mechanism, and perhaps the entire sensor, remotely. The locking mechanism also can be supplied with a motor which will rotate the shaft, to allow for assisted, rather than manual, adjustment or fine tuning of the sensor's rotational position. The bubble level can be replaced with an level which produces an electrical signal. This level, in turn, can be operatively connected to the above noted motor. This can allow for automatic adjustment of the sensor level. Using such a device, the aligner sensor need merely be connected to the wheel with the worm and gear in meshing contact. The automatic leveling could be started to automatically level the sensor and lock it in the level position once attained. The electronic level sensor could also be operatively connected to the above noted solenoid to activate the solenoid once the level sensor determines that the aligner is level. In this instance, the operator would slowly manually rotate the sensor about shaft 25. When the level sensor determine the aligner sensor to be level, it would activate the solenoid to lock the sensor in place. These variations are merely illustrative.

I claim:

1. A vehicle wheel aligner including a plurality of wheel adapters removably mountable to wheels of a vehicle to rotate with the wheels, the wheel adapters each having a generally horizontal bore, and a plurality of sensors pivotally mountable to the adapters; each sensor having a sensor housing, a shaft rotatably journaled in said sensor housing and extending from said sensor housing to be received in said adapter bore to pivotably hang said sensor on said adapter, a shaft locking mechanism in said adapter to rotationally fix said shaft to said adapter, and a sensor locking mechanism to lock the sensor against pivotal motion with respect to the adapter; said sensor locking mechanism including:

a gear fixed to said shaft within said housing;

a lever mounted in a said housing for pivotal motion in a plane parallel to said gear; and a worm on said lever intermediate a top end and a bottom end of said lever, said worm having a spiral which is selectively engagable with said gear; said lever being pivotal between a first, locked, position in which said worm spiral engages said gear, and a second, unlocked, position in which said worm spiral are out of engagement with said gear; whereby, when said level is in said locked position, said gear and said worm cooperate to prevent rotation of said sensor about said shaft.

2. The aligner of claim 1 wherein said worm is integrally formed with said lever.

3. The aligner of claim 1 wherein said lever is axially rotatably mounted in said housing, whereby when said lever is rotated when in said locked position, said sensor will be pivoted about said shaft.

4. The aligner of claim 3 wherein said lever pivots about a point above said worm.

5. The aligner of claim 4 wherein said lever includes an annular groove, said housing including a pivot pin positioned adjacent a side of said groove, said pivoting pin defining a pivot point for said lever, and a retaining bracket for mounting said lever in said housing; said retaining bracket including a second pin extending said annular groove on an opposite side of said groove from said pivot pin.

6. The aligner of claim 5 wherein said retainer includes a plate extending between said pivot and second pins forwardly of said lever.

7. The aligner of claim 6 wherein a bobbin is fixed to said lever against vertical movement, said bobbin defining said annular groove.

8. The aligner of claim 7 wherein said lever may rotate with respect to said bobbin.

9. The aligner of claim 5 including a thrust bearing, said lever bottom end being rotatably journaled in said thrust bearing.

10. The aligner of claim 9 including a over-center spring to bias said lever to a desired position; said over-center spring including at least one coil; said at least one coil having a first lead secured to said thrust bearing and a second lead secured to said housing.

11. The aligner of claim 3 wherein said lever pivots about a point below said worm.

12. The aligner of claim 11 including a journal box pivotally mounted in said housing, said shaft rotatably extending through said journal box.

13. The aligner of claim 12 including an over-center spring which will bias said lever in a desired position.

14. The aligner of claim 13 wherein said over-center spring is a coil spring operatively connected at one end to said lever and connected at another end to said housing at a point vertically below said lever.

15. The aligner of claim 14 including a thrust bearing, said shaft being rotatably journaled in said thrust bearing, said spring first end being connected to said bearing.

16. The aligner of claim 1 including unlocking means for automatically moving said locking bar from said locked position to said unlocked position when said vehicle wheel is rotated beyond a desired angle.

17. The aligner of claim 16 wherein said unlocking means includes said gear and said worm spiral, wherein when said wheel is rotated beyond a desired angle, continued rotation of said wheel beyond said desired angle causes said gear's teeth to urge said worm spiral out of engagement with said gear.

18. The aligner of claim 1 wherein said lever extends through a top of said sensor housing to be pivoted by an operator.

19. The aligner of claim 1 including an actuator operably connected to said lever to pivot said lever between said locked and unlocked positions when activated.

20. The aligner of claim 1 including means for remotely activating said actuator to remotely operate said sensor lock.

21. A locking mechanism for pivotally locking a sensor of a vehicle wheel aligner in a desired position; the sensor including a shaft which is received by and pivotally fixed to a sensor adapter to removably mount said sensor to a vehicle wheel; said shaft being rotatable with respect to said sensor; said locking mechanism including a gear fixed to said shaft within said housing; and a lever pivotally mounted in said housing; said lever including a worm having a spiral which is selectively engagable with said gear; said lever being pivotal between a first, locked, position in which said worm spiral engages said gear, and a second, unlocked, position in which said worm spiral is out of engagement with said gear, said worm spiral and gear cooperating when said lever is in said locked position to prevent pivotal movement of said sensor housing with respect to said shaft, and hence said vehicle wheel.

22. The locking mechanism of claim 21 wherein said lever includes an annular groove, said locking mechanism including a pivot pin tangentially passing through said groove to define a pivot point for said lever, and a retainer mounted in said housing to secure said lever in said housing, said retainer including a second pin extending tangentially through said groove on a side of said groove opposite from said pivot pin; said groove being sized and shaped to allow said lever to be pivoted between its said locked and unlocked positions.

23. The locking mechanism of claim 22 wherein said lever is mounted in said sensor for rotation, whereby when said locking bar is rotated in said locked position, said sensor will be pivoted about said shaft.

24. The locking mechanism of claim 23 including an over-center spring operatively connected to said lever to bias said lever in a desired position, said over-center spring including at least one coil having a first lead operatively connected to said lever and a second lead operatively connected to said housing.

25. A method for locking a sensor of a vehicle wheel aligner in a desired position, the vehicle wheel aligner including a plurality of said sensors pivotally mounted to wheels of a vehicle, each sensor including a shaft which is received in a wheel adapter to penduously mount said sensor to said wheel, said shaft being rotatable with respect to said sensor and pivotally locked with respect to said wheel adapter, a gear pivotally fixed to said shaft in said sensor, a lever pivotally mounted in said sensor, and a worm on said lever, said worm being selectively movable between a locked position in which said worm is in engagement with said gear, and an unlocked position in which said worm is out of engagement with said gear; said method comprising:

pivoting said lever to move said worm from said first position to said second position.

26. The method of claim 25 including a step of adjusting the position of said sensor, said lever being mounted in said housing for axial rotation, said step of adjusting said sensor position including rotating said lever, and hence said worm, when said worm is in its locked position.

27. The method of claim 25 including a step of unlocking said sensor to allow pivotal motion of said sensor with respect to said vehicle wheel, said unlocking step including moving said worm out of engagement from said gear.

28. The method of claim 27 wherein said unlocking step includes rotating one of said wheel and said sensor with respect to the other.

29. A sensor for a vehicle wheel aligner, said sensor being pivotally mountable to a wheel adapter which is securable to a vehicle wheel, said sensor having:

a sensor housing, a shaft rotatably journaled in said sensor housing and extending from said sensor housing to be received in said adapter to pivotably hang said sensor on said adapter;

a sensor locking mechanism to lock the sensor against pivotal motion with respect to the adapter, said sensor locking mechanism being selectively switchable between a locked mode and an unlocked mode; and an adjustment mechanism for adjusting the rotational position of said sensor when said sensor lock is in said locked mode.

30. The vehicle wheel aligner of claim 29 wherein said sensor locking mechanism includes:

a gear fixed to said shaft within said housing;

a lever mounted in a said housing for pivotal motion in a plane parallel to said gear; and a worm on said lever intermediate a top end and a bottom end of said lever, said worm having a spiral which is selectively engagable with said gear; said lever being pivotal between a first, locked, position in which said worm spiral engages said gear, and a second, unlocked, position in which said worm spiral is out of engagement with said gear; whereby, when said level is in said locked position, said gear and said worm cooperate to prevent rotation of said sensor about said shaft.

31. The vehicle wheel aligner of claim 30 wherein said adjustment mechanism includes said locking mechanism, said lever and worm being rotatably mounted in said sensor housing, such that when said lever and worm are rotated when in said locked position, said worm and gear will interact to pivot said sensor with respect to said gear, and hence said wheel adapter and wheel assembly.

32. The vehicle wheel aligner of claim 31 including means for automatically leveling said sensor, said automatic leveling means including:

a level sensor mounted to said sensor housing, said level sensor outputting a signal indicative of the level of said sensor;

a motor operatively connected to said worm to rotate said worm; and a controller for said motor responsive to the signal output by said level sensor, whereby when said level sensor determines said controller stops operation of said motor.

33. The vehicle wheel aligner of claim 29, wherein said adjustment mechanism is remotely actuable.

34. The vehicle wheel aligner of claim 29, wherein said sensor locking mechanism is remotely actuable.

* * * * *